(12) United States Patent
Desai et al.

(10) Patent No.: US 10,498,815 B2
(45) Date of Patent: Dec. 3, 2019

(54) DATA RECOVERY OBJECTIVE MODELING

(71) Applicant: NetApp Inc., Sunnyvale, CA (US)

(72) Inventors: Rajesh Desai, Sunnyvale, CA (US); Divya Yogesh, Bangalore (IN); Ravi Krishna Budhia, San Jose, CA (US); Jose Mathew, Santa Clara, CA (US)

(73) Assignee: NetApp Inc., Sunnyvale, CA (US)

( * ) Notice: Subject to any disclaimer, the term of this patent is extended or adjusted under 35 U.S.C. 154(b) by 432 days.

(21) Appl. No.: 14/798,835

(22) Filed: Jul. 14, 2015

(65) Prior Publication Data

US 2016/0344812 A1  Nov. 24, 2016

(30) Foreign Application Priority Data

May 21, 2015 (IN) .......................... 2554/CHE/2015

(51) Int. Cl.
  *H04L 29/08* (2006.01)
  *H04L 12/24* (2006.01)
  *H04L 29/14* (2006.01)

(52) U.S. Cl.
  CPC ...... *H04L 67/1097* (2013.01); *H04L 41/0896* (2013.01); *H04L 69/40* (2013.01)

(58) Field of Classification Search
  CPC .................................................. G06F 17/30575
  See application file for complete search history.

(56) References Cited

U.S. PATENT DOCUMENTS

| | | | | |
|---|---|---|---|---|
| 9,477,661 | B1* | 10/2016 | Chamness | ............... G06F 11/14 |
| 2012/0023209 | A1* | 1/2012 | Fletcher | ............ H04L 12/40195 709/223 |
| 2013/0262396 | A1* | 10/2013 | Kripalani | .......... G06F 17/30289 707/674 |
| 2015/0254150 | A1* | 9/2015 | Gordon | ............... G06F 11/1662 714/6.3 |
| 2016/0124818 | A1* | 5/2016 | Wang | ................... G06F 11/203 714/4.12 |

\* cited by examiner

*Primary Examiner* — Oleg Survillo
*Assistant Examiner* — Christopher P Cadorna
(74) *Attorney, Agent, or Firm* — Cooper Legal Group, LLC

(57) ABSTRACT

One or more techniques and/or systems are provided for data recovery objective modeling. For example, a data recovery objective model may be defined for a storage network environment. The data recovery objective model may be defined based upon a client data ingest rate corresponding to a data change rate by one or more clients of data stored by a first storage controller. The data recovery objective model may be defined based upon an effective throughput of a data transfer utility for replicating modified data from first storage of the first storage controller to second storage of a second storage controller. Statistical utilization data may be collected from the storage network environment, and may be evaluated using the data recovery objective model to determine a data recovery objective metric. If the data recovery objective metric does not satisfy a client specified objective, then a computing resource recommendation may be provided.

20 Claims, 10 Drawing Sheets

DATA RECOVERY OBJECTIVE MODELING

BACKGROUND

A storage network environment may comprise one or more storage controllers (e.g., nodes) configured to provide clients with access to client data stored within storage devices. For example, a first storage controller may provide a client with access to client data stored with a first storage device. Unfortunately, if the first storage controller fails or a disaster occurs, then the client may be unable to access the client data. Accordingly, a second storage controller may be configured as a failover storage controller for the first storage controller. Client data within the first storage device may be mirrored or replicated to a second storage device associated with the second storage controller (e.g., modifications to the client data may be replicated to the second storage device). Thus, when the first storage controller fails or the disaster occurs, the second storage controller can provide the client with failover access to replicated client data within the second storage device.

Various clients may maintain storage network environments with different hardware and/or software configurations. Determining an appropriate amount and type of hardware and/or software may be time consuming and error prone (e.g., merely manual rules of thumb and human estimations may be used). For example, a client may specify a client specified objective, such as a recovery point objective (RPO), corresponding to a maximum acceptable time period prior to a failure or disaster during which changes to client data may be lost as a consequence of recovery. That is, as data within the first storage device is modified, a data transfer utility may replicate the modified data from the first storage device to the second storage device. In order to achieve an RPO, the data transfer utility is constrained to transferring the modified data in less than or equal to half an RPO time of the RPO. However, the smaller RPO time may result in less time available to finish a transfer before starting a subsequent transfer. Thus, it may be advantageous to determine a desired RPO time and/or what hardware and software will provide such an RPO time, and it may also be advantageous to determine what RPO can be achieved given specified hardware and software.

DETAILED DESCRIPTION

Figure 1:
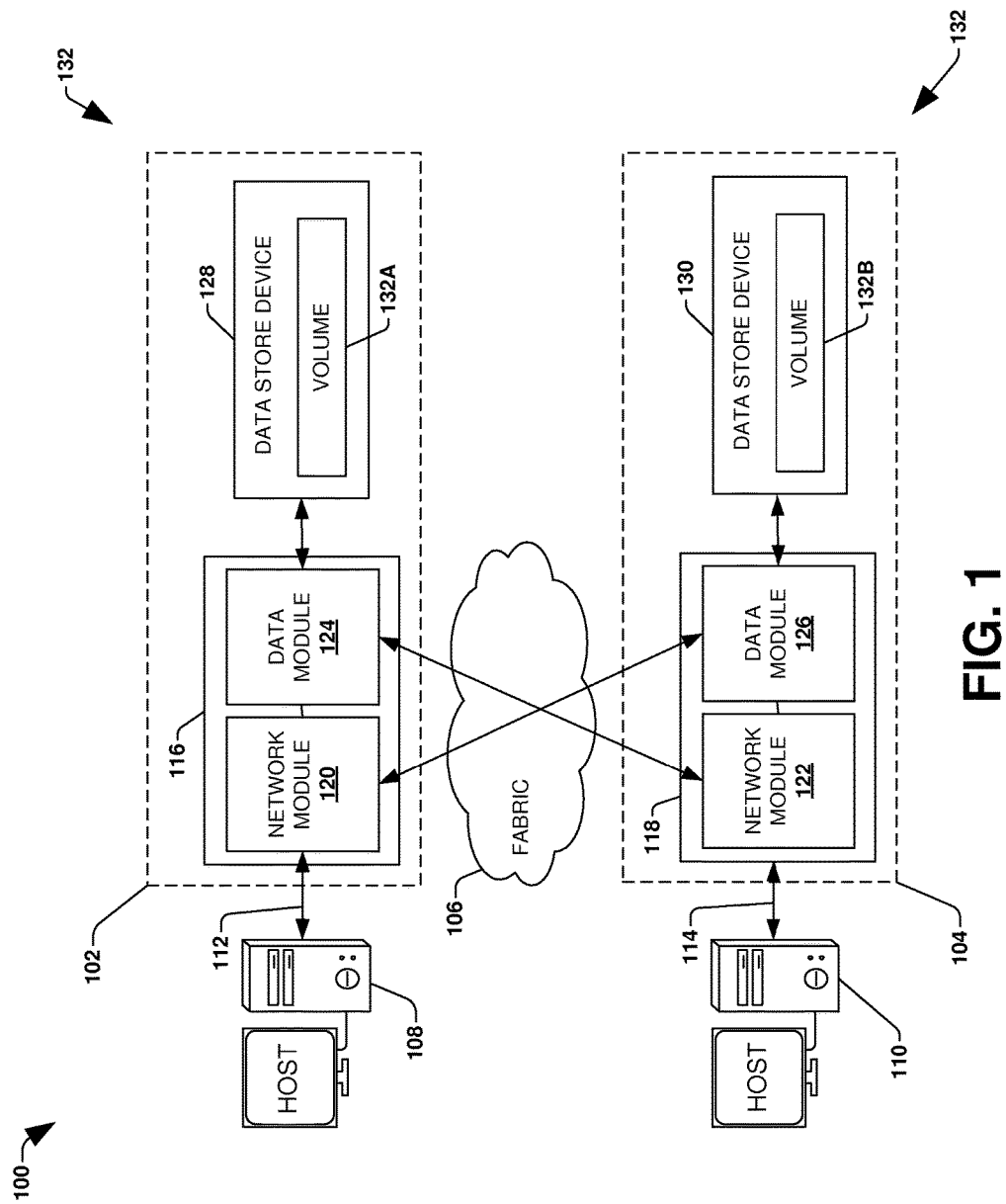
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for data recovery objective modeling are provided herein. For example, a data recovery objective model may be defined for a storage network environment. The data recovery objective model may be based upon a client data ingest rate corresponding to a data change rate by one or more clients of data stored by a first storage controller. The data recovery objective model may be based upon an effective throughput of a data transfer utility for replicating modified data from first storage of the first storage controller to second storage of the second storage controller. The effective throughput may be based upon network bandwidth, available processing resources, and/or data transfer bandwidth available to the data transfer utility. Statistical utilization data of the storage network environment (e.g., client data ingest rate data and/or effective throughput data) may be collected and evaluated using the data recovery objective model to determine a data recovery objective metric for the storage network environment (e.g., an estimated recovery point objective (RPO) based upon current hardware and/or software resources of the storage network environment) in an automated manner. If the data recovery objective model does not satisfy a client specified objective (e.g., a client specified RPO), then a computing resource recommendation may be provided, such as a recommendation to add and/or upgrade a storage controller.

To provide context for data recovery objective modeling, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that data recovery objective modeling may be implemented within the clustered network environment 100. For example, a model definition component, a performance modeler component, and/or a data transfer utility may be hosted within node 116 and/or node 118. The data transfer utility may replicate modified data from data storage device 128 of node 116 to data storage device 130 of node 118. The model definition component and/or the performance modeler component may determine data recovery objective metrics associated with such replication.

Figure 2:
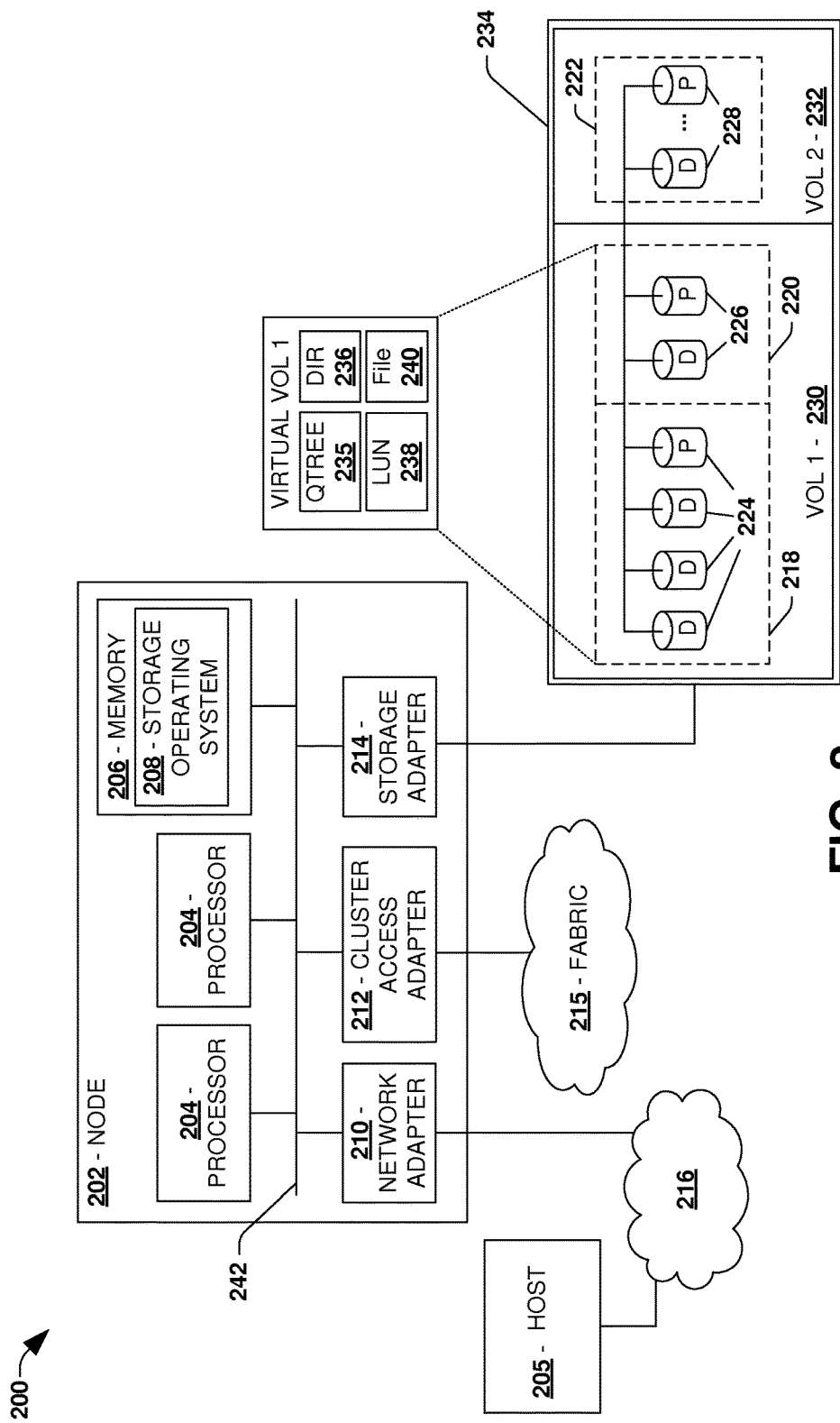
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that data recovery objective modeling may be implemented for the data storage system 200. For example, a model definition component, a performance modeler component, and/or a data transfer utility may be hosted within node 202. The data transfer utility may replicate modified data from data storage devices 234 of node 202 to data storage device of another node. The model definition component and/or the performance modeler component may determine data recovery objective metrics associated with such replication.

Figure 3A:
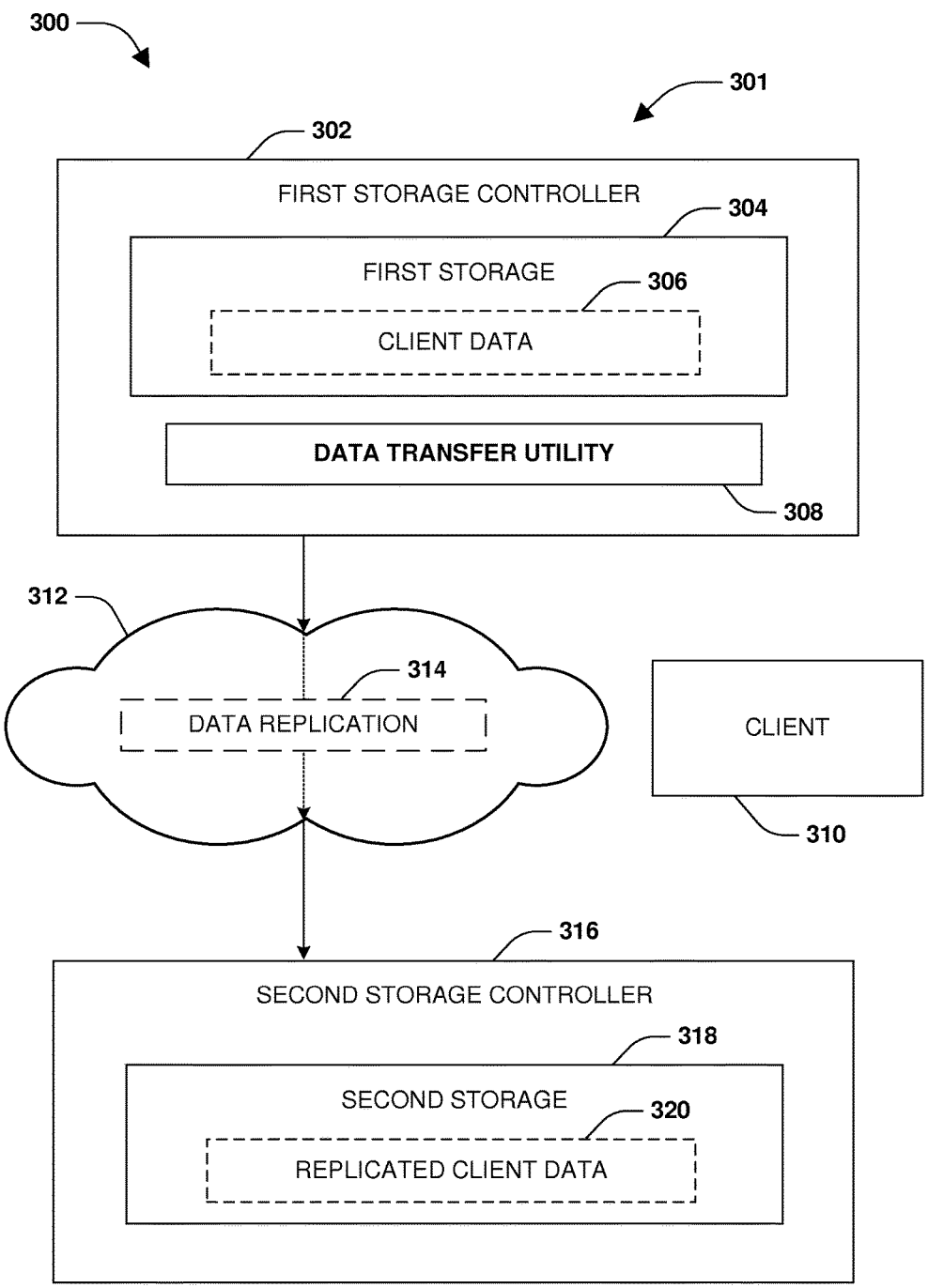
FIG. 3A is an example of a data transfer utility replicating client data from first storage of a first storage controller to second storage of a second storage controller.

FIGS. 3A-3D illustrate examples of a storage network environment 301. The storage network environment 301 may comprise a first storage controller 302, a second storage controller 316, and/or other storage controllers not illustrated. FIG. 3A illustrates an example 300 of the first storage controller 302 that is configured to store and provide a client 310 with access to client data 306 within first storage 304 (e.g., one or more storage devices, logical unit numbers (LUN)s, volumes, etc.). The second storage controller 316 may be configured as failover storage controller for the first storage controller 302. A data transfer utility 308 may be configured to replicate 314 the client data 306, such as modifications to the client data 306, over a network 312 from the first storage 304 to second storage 318 of the second storage controller 316 as replicated client data 320. Factors that may affect the efficiency, timing, and/or parameters of the replication 314 may correspond to how frequently the client 310 modifies the client data 306, processing resources such as CPU resources of the first storage controller 302 that are available to the data transfer utility 308, network bandwidth of the network 312, and/or data transfer bandwidth of the data transfer utility 308. In this way, if the first storage controller 302 fails or a disaster occurs, then the second storage controller 316 may provide the client 310 with failover access to the replicated client data 320.

Figure 3B:
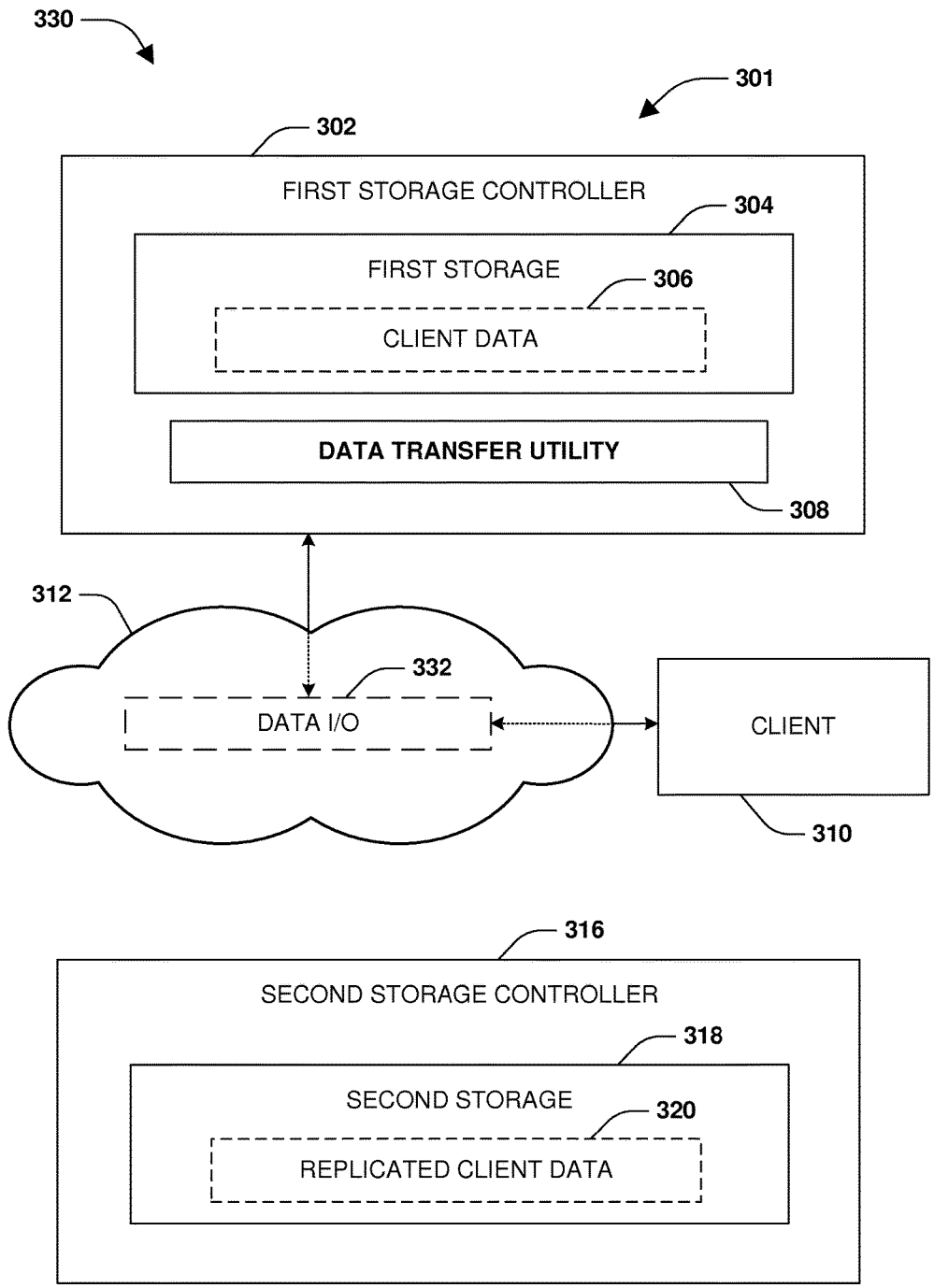
FIG. 3B is an example of a client access client data through a first storage controller.
Figure 3C:
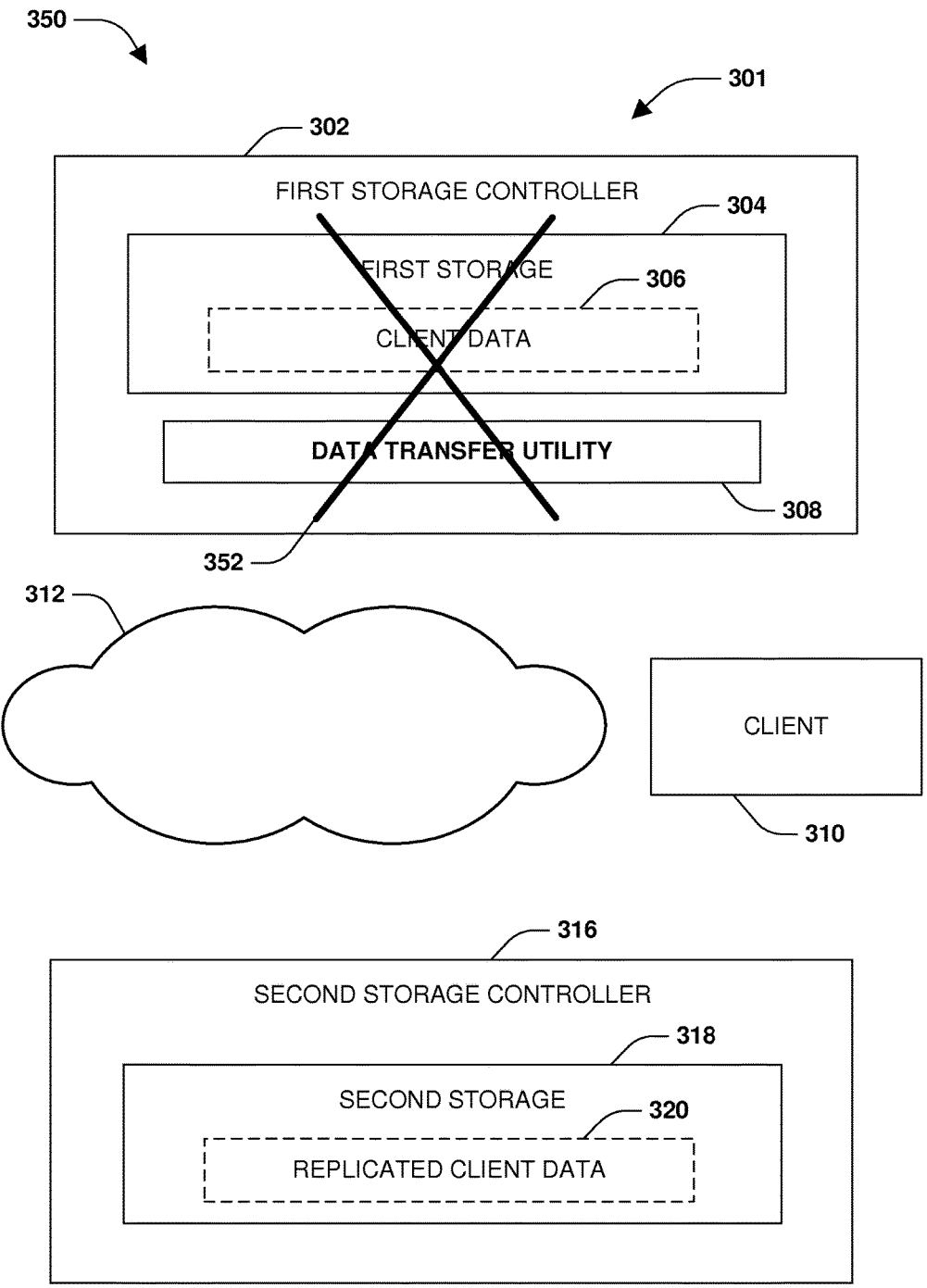
FIG. 3C is an example of a first storage controller failing.
Figure 3D:
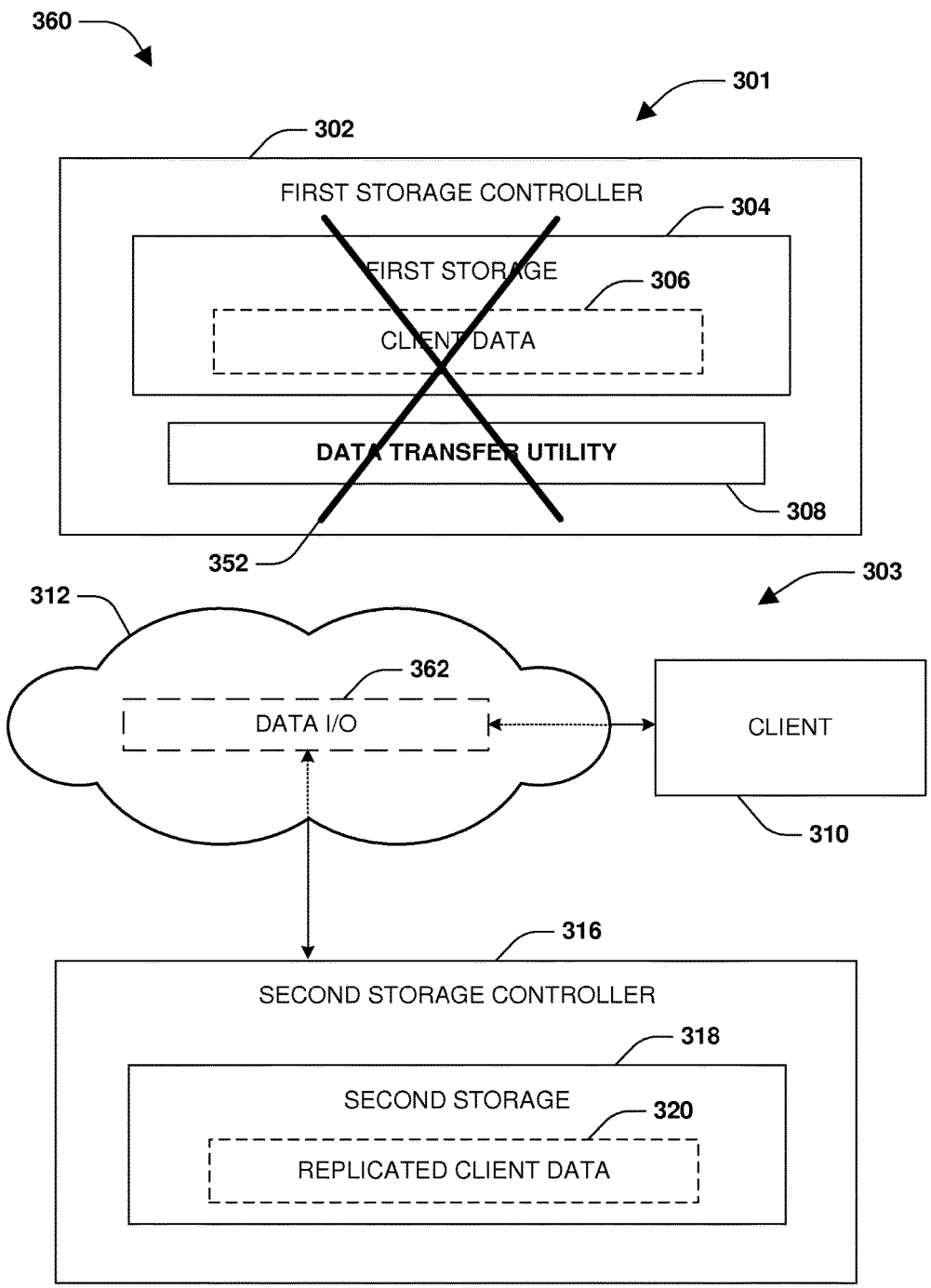
FIG. 3D is an example of a second storage controller providing a client with failover access to replicated client data.

FIG. 3B illustrates an example 330 of the first storage controller 302 providing the client 310 with data I/O access 332 to the client data 306 within the first storage 304. FIG. 3C illustrates an example 350 of the first storage controller 302 failing 352. Thus, the client 310 may not have access, through the first storage controller 302, to the client data 306. FIG. 3D illustrates an example 360 of the second storage controller 316 providing the client device 310 with failover data I/O access 362 to the replicated client data 320.

Figure 4:
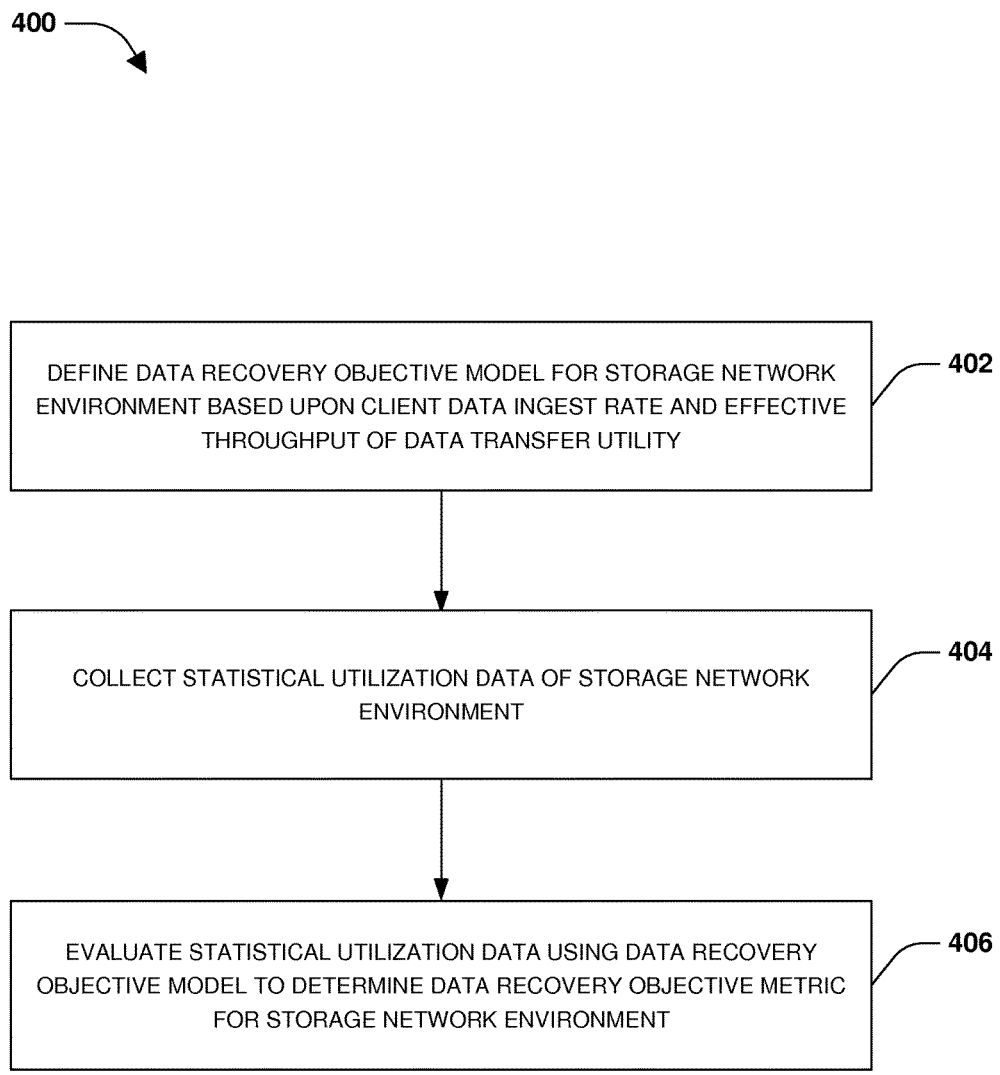
FIG. 4 is a flow chart illustrating an exemplary method of data recovery objective modeling.

One embodiment of data recovery objective modeling is illustrated by an exemplary method 400 of FIG. 4. A storage network environment may comprise one or more storage controllers, such as a first storage controller and a second storage controller, configured to provide clients with access to data stored within storage. In an example, the second storage controller may be configured as a failover storage controller for the first storage controller so that the second storage controller may provide clients with failover access to replicated data that was replicated from first storage of the first storage controller to second storage of the second storage controller. A client may specify a client specified objective for the replication, such as a recovery point objective (RPO). For example, the client specified objective may specify a maximum acceptable time period prior to a failure or disaster of the first storage controller during which changes to data within the first storage may be lost as a consequence of recovery such as due to failover to the second storage controller (e.g., a recent update to a file stored within the first storage may be lost because the first storage controller may fail before the data transfer utility has a change to replicate the file update to the second storage).

As provided herein, it may be advantageous to determine data recovery objective metrics for the storage network environment in an automated manner, which may mitigate time and/or error introduced by manual human guessing and rules of thumb. A data recovery objective metric may be an estimate of an RPO for the storage network environment, which may be automatically determined based upon client data ingest rates, effective throughput of the data transfer utility, and/or availability of hardware and/or software within the storage network environment for the data transfer utility (e.g., network bandwidth, available processing resources, data transfer bandwidth, etc.). Thus, if the data recovery objective metric does not satisfy a client specified objective (e.g., current hardware and/or software of the network storage environment may not be adequate for the data transfer utility to adequately replicate data such that less than a threshold amount of changed data is lost in the event of a failure), then a recommendation to add and/or change computing hardware resources of the storage network environment may be provided.

At 402, a data recovery objective model may be defined for the storage network environment. The data recovery objective model may be defined based upon various settings and/or configurations of the data transfer utility, such as a non-continuous transfer setting (e.g., a transfer may start at time A and end at time B, and a subsequent transfer may start sometime after time B), a continuous transfer setting (e.g., a transfer may start at time A and end at time B, and a subsequent transfer may start at time B), etc. The data recovery objective model may be defined based upon various attributes and/or client specific usage of the storage network environment. For example, the data recovery objective model may be based upon a client data ingest rate corresponding to a data change rate by one or more clients of data stored by the first storage controller. The more frequently clients change data and the more data that is changed, then the data transfer utility has more modified data to replicate from the first storage of the first storage controller to second storage of the second storage controller. The data recovery objective model may be defined based upon an effective throughput of the data transfer utility for replicating modified data from the first storage of the first storage controller to the second storage of the second storage controller. The effective throughput may correspond to network bandwidth of a network over which the first storage controller and the second storage controller are communicatively coupled, available processing resources to the data transfer utility (e.g., CPU resources available to the data transfer utility from the first storage controller), a data transfer bandwidth of the data transfer utility (e.g., a maximum write update bandwidth of the first storage controller), etc.

In an example, the data recovery objective model may be defined to comprise a time constraint boundary for a data recovery objective metric (e.g., the data recovery objective metric may be bounded to 24 hours or any other time constraint because as a value of the client data ingest rate reaches a value of the effective throughput, the data recovery objective metric may otherwise approach infinity). In an example, the data recovery objective model may be defined to comprise a margin of error percentage metric (e.g., a value of 0.25 corresponding to a 25% margin of error, or any other value). In an example, the data recovery objective model may be defined to comprise a validity constraint where the client data ingest rate (e.g., an effective client ingest rate, which may take into account overwrite operations) is restricted from being equal to or greater than the effective throughput of the data transfer utility, otherwise the data transfer utility may be unable to keep up with replicating modified data at a rate at which data is modified by clients. In an example, the data recovery objective model may be defined based upon a transfer overhead metric corresponding to a time to complete one or more concurrent null transfers from the first storage controller to the second storage controller (e.g., 90 seconds or any other value).

At 404, statistical utilization data may be collected from the storage network environment. In an example, a client data ingest rate value, corresponding to a rate at which data stored by the first storage controller is modified by clients, may be collected. In another example, effective throughput of the data transfer utility may be collected. For example, network bandwidth, available processing resources to the data transfer utility, data transfer bandwidth of the first storage controller, and/or other throughput metric statistics may be collected. At 406, the statistical utilization data may be evaluated using the data recovery objective model to determine a data recovery objective metric for the storage metric. The data recovery objective metric may correspond to an estimated RPO corresponding to data loss and/or timing to perform failover recovery from a failure of the first storage controller to the second storage controller (e.g., an indication of a time period prior to failure of the first storage controller during which changes to data may be lost as a consequence of recovery and/or failover to the second storage controller). In this way, data recovery objective metrics, such as RPOs, of network storage environments may be automatically determined in an automated manner. In an example where the data recovery objective metric does not satisfy a client specified objective (e.g., the data recovery objective metric indicates that too much data may be lost as the consequence of recovery), a recommendation may be included within a computer resource commendation to add a computing hardware resources to the storage network environment, such as additional memory, CPU processing power, network bandwidth, and/or other resources that may improve the data transfer utility's ability to more efficiently replicate modified data to the second storage of the second storage controller.

Figure 5A:
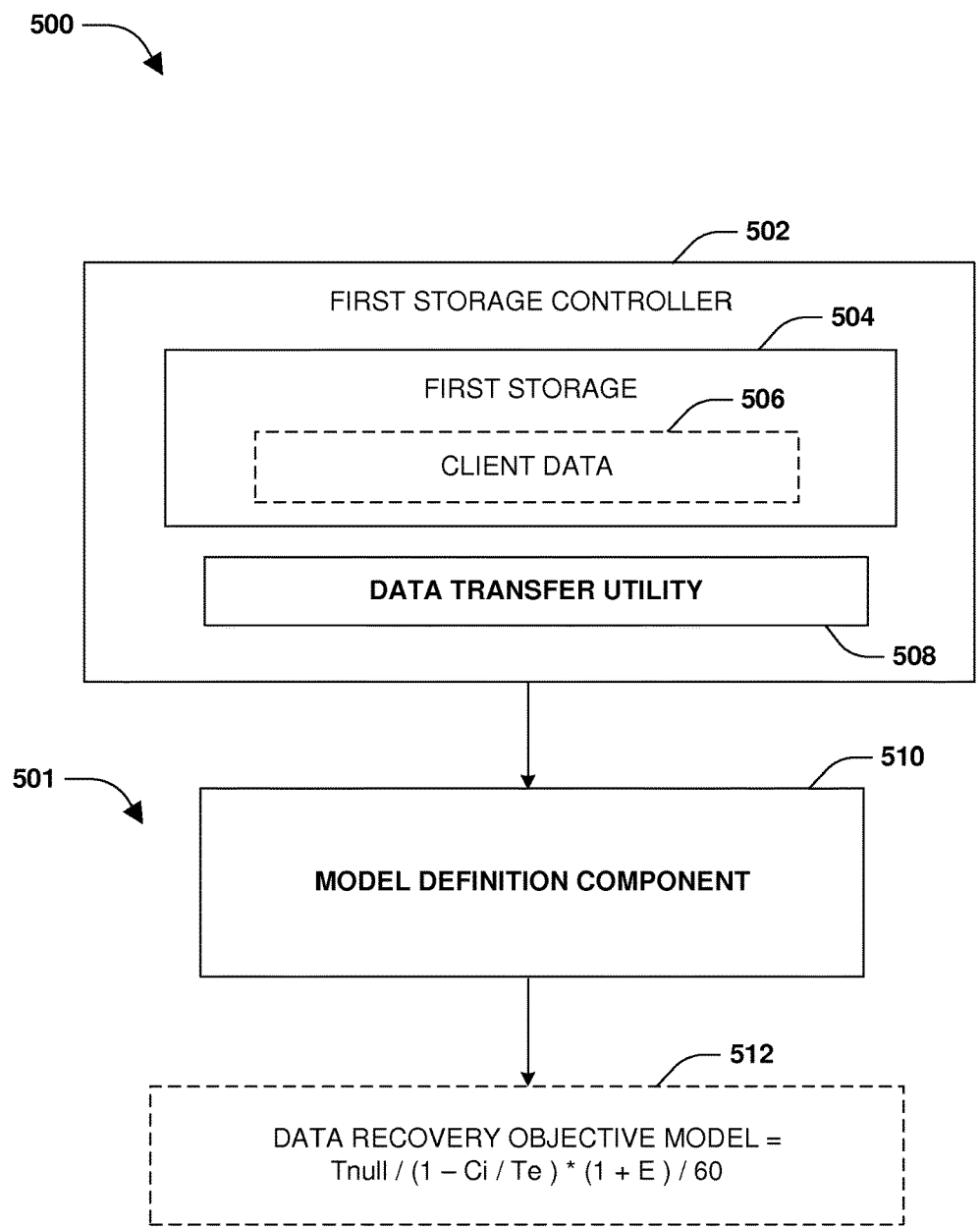
FIG. 5A is a component block diagram illustrating an exemplary system for data recovery objective modeling, where a data recovery objective model is defined.
Figure 5B:
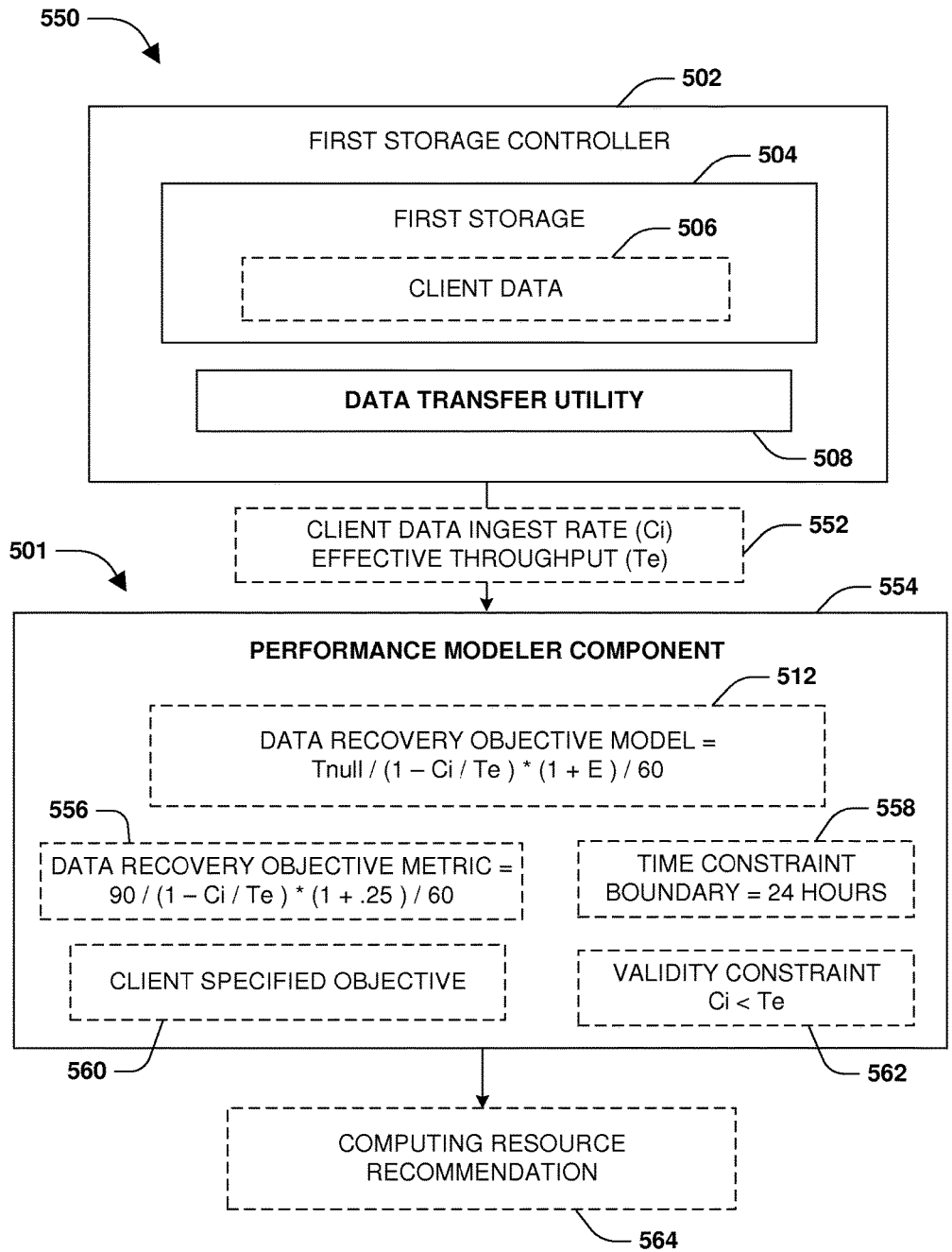
FIG. 5B is a component block diagram illustrating an exemplary system for data recovery objective modeling, where a data recovery objective metric is determined.

FIGS. 5A-5B illustrate examples of a system 501 for data recovery objective modeling. FIG. 5A illustrates an example 500 of the system 501 comprising a model definition component 510. The model definition component 510 may be associated with a network storage environment comprising a first storage controller 502. The first storage controller 502 may be configured to store client data 506 within first storage 504. A data transfer utility 508 may be configured to replicate the client data 506, such as modifications to the client data 506, to second storage of a second storage controller. The modeling definition component 510 may be configured to define a data recovery objective model as $$\frac{Tnull}{\left(1-\frac{Ci}{Te}\right)} \times \frac{(1+E)}{60},$$

where Tnull corresponds to a transfer overhead metric (e.g., a time to complete one or more concurrent null transfers from the first storage controller 502 to a second storage controller), Ci corresponds to a client data ingest rate (e.g., a data change rate by clients modifying the client data 506), Te corresponds to an effective throughput of the data transfer utility 508 (e.g., network bandwidth, processing resources of the first storage controller 502 that are available to the data transfer utility 508, a data transfer bandwidth of the first storage controller 502, etc.), E corresponds to a margin of error percentage metric, and 60 corresponds to 60 seconds, such that the data recovery objective model may provide a data recovery objective metric in minutes or any other unit. In this way, statistical utilization data of the storage network environment may be collected and evaluated against the data recovery objective model 512 to determine a data recovery objective metric such as an estimated RPO corresponding data loss and/or timing to perform failover recovery from a failure of the first storage controller 502 to the second storage controller (e.g., a time period prior to failure of the first storage controller 502 during which changes to the client data 506 may be lost as a consequence of recovery and/or failover to the second storage controller to take over for the first storage controller 502)

FIG. 5B illustrates an example 550 of the system 501 comprising a performance modeler component 554. The performance modeler component 554 may be configured to collect statistical utilization data 552 of the storage network environment, such as a client data ingest rate value and an effective throughput value. The performance modeling component 554 may evaluate the statistical utilization data 552 using the data recovery objective model 512 to determine a data recovery objective metric 556. For example, the client data ingest rate value may be used for the client data ingest rate Ci, the effective throughput value may be used for the effective throughput Te, a 0.25 value (e.g., a 25% margin of error) or any other value may be used for the margin of error percentage metric E, and a value of 90 seconds or any other value may be used for the transfer overhead metric Tnull. The data recovery objective metric 556 may be an estimated RPO corresponding to data loss and/or timing to perform failover recovery from a failure of the first storage controller 502 to the second storage controller.

In an example, a time constraint boundary 558, such as 24 hours or any other value, may be applied to the data recovery objective metric 556 so that the data recovery objective metric 556 does not approach an infinite value when the client data ingest rate Ci approaches the effective throughput Te. In an example, a validity constraint 562 may be applied to the data recovery objective metric 556, such as a constraint that the client data ingest rate Ci (e.g., effective client ingest rate that takes into account overwrite operations) is to be less than the effective throughput Te, otherwise, the data transfer utility 508 may be unable to keep up with replicating modified client data 506 because the client data 506 changes too quickly.

The data recovery objective metric 556 may be based upon a current hardware and/or software state of the storage network environment (e.g., networking resources and bandwidth, processing resources, and/or other resources available to the data transfer utility 508). The performance modeler component 554 may compare the data recovery objective metric 556 to a client specified objective 560 (e.g., a maximum acceptable time period prior to a failure or disaster of the first storage controller 502 during which changes to the client data 506 may be lost as a consequence of recovery). If the data recovery objective metric 556 does not satisfy the client specified objective 560, then the performance modeler component 554 may create a computing resource recommendation 564 that may include a recommendation to add a computing hardware resource (e.g., a new CPU, upgraded memory, increased networking capabilities, a new storage controller, etc.) for the storage network environment.

Figure 6:
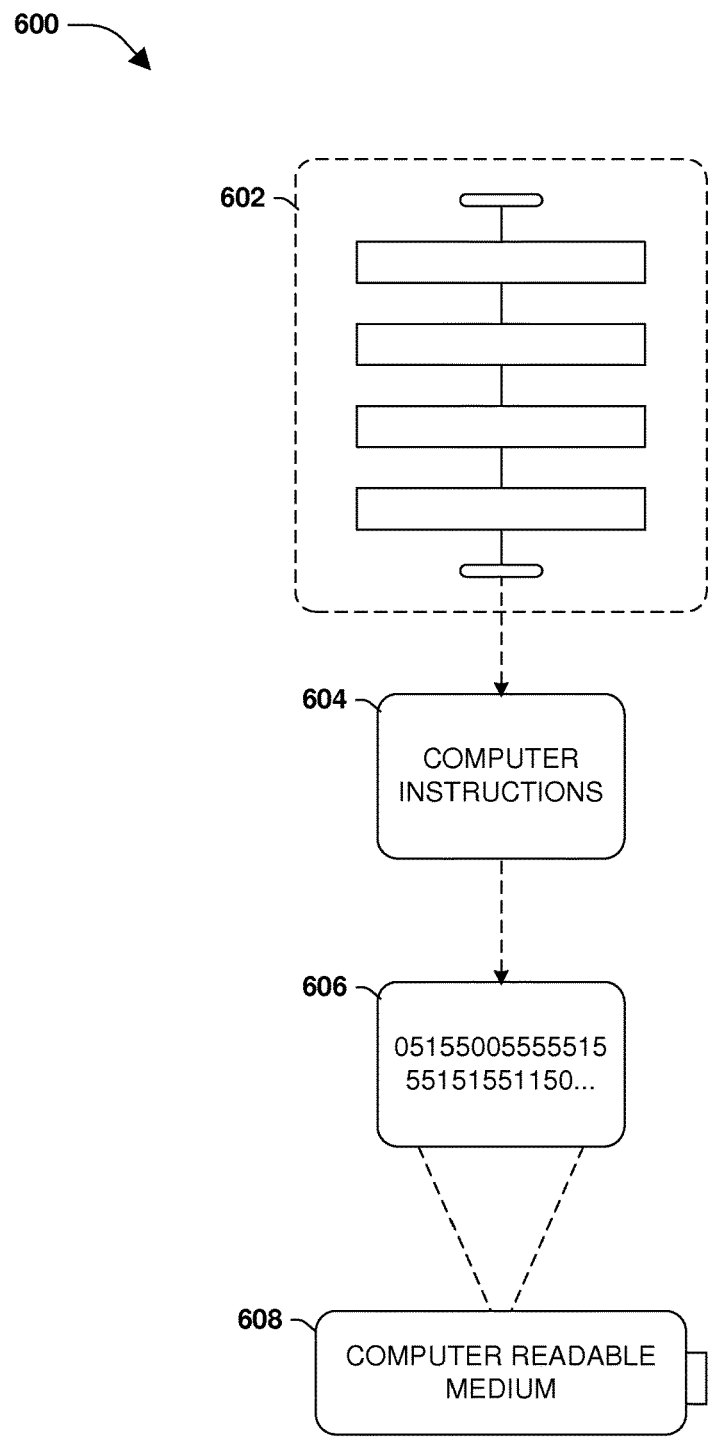
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable instructions 604 are configured to implement a system, such as at least some of the exemplary system 501 of FIGS. 5A-5B, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    determining a recovery objective metric based upon an ingest rate value, corresponding to a rate at which clients modify data that is replicated by a transfer utility from a first device to a second device over a network, and an effective throughput of the transfer utility to replicate the data, wherein the ingest rate value and the effective throughput are used by a recovery objective model to generate the recovery objective metric as a ratio of a time to complete a plurality of null transfers from the first device to the second device to a ratio of the ingest rate value to the effective throughput, and as a ratio of a margin of error percentage metric to a timespan;
    determining that the recovery objective metric, specifying an estimated amount of data loss and time to perform a failover from the first device to the second device using current resources of the network and the first and second devices, fails to satisfy a client specified objective of an acceptable amount of data loss and time to perform the failover; and
    facilitating modification of computing resources of the network for the transfer utility to replicate modified data from the first device to the second device based upon the recovery objective metric failing to satisfy the client specified objective.

2. The method of claim 1, wherein the effective throughput corresponds to a network bandwidth of the network over which the first device and the second device are communicatively coupled.

3. The method of claim 1, wherein the effective throughput corresponds to available processing resources of the first device and the second device.

4. The method of claim 1, wherein the effective throughput corresponds to a data transfer bandwidth of the first device and the second device.

5. The method of claim 1, comprising:
applying a time constraint boundary to the recovery objective metric to avoid the recovery objective metric approaching infinity as the ingest rate value reaches a value of the effective throughput.

6. The method of claim 1, wherein the recovery objective metric comprises an estimated recovery point objective.

7. The method of claim 1, comprising:
applying a validity constraint to the recovery objective model so that the ingest rate value is less than the effective throughput.

8. The method of claim 7, wherein the validity constraint indicating that the ingest rate value at which data of the first device is modified is to be less than the effective throughput of the transfer utility replicating the modified data.

9. The method of claim 1, wherein the client specified objective specifies a maximum acceptable time period prior to failure of the first device during which changes to data can be lost as a consequence of recovering from the failure.

10. The method of claim 1, wherein the second device configured as a failover storage controller for the first device.

11. The method of claim 10, wherein the second device provides clients with failover access to replicated data replicated by the transfer utility from storage of the first device to storage of the second device based upon the first device failing.

12. The method of claim 1, wherein a computing hardware resource is added to the network.

13. The method of claim 1, wherein the recovery objective model is a recovery point objective defining a maximum acceptable time period prior to failure of the first device during which changes to client data can be lost.

14. The method of claim 1, comprising:
defining the recovery objective model based upon a non-continuous transfer setting of the transfer utility.

15. The method of claim 1, comprising:
defining the recovery objective model based upon a continuous transfer setting of the transfer utility.

16. A system, comprising:
a processor; and
a memory containing instructions, which when executed by the processor, cause the processor to:
determine a recovery objective metric based upon an ingest rate value, corresponding to a rate at which clients modify data that is replicated by a transfer utility from a first device to a second device over a network, and an effective throughput of the transfer utility to replicate the data, wherein the ingest rate value and the effective throughput are used by a recovery objective model to generate the recovery objective metric as a ratio of a time to complete a plurality of null transfers from the first device to the second device to a ratio of the ingest rate value to the effective throughput, and as a ratio of a margin of error percentage metric to a timespan;
determine that the recovery objective metric, specifying an estimated amount of data loss and time to perform a failover from the first device to the second device using current resources of the network and the first and second devices, fails to satisfy a client specified objective of an acceptable amount of data loss and time to perform the failover; and
facilitate modification of computing resources of the network for the transfer utility to replicate modified data from the first device to the second device based upon the recovery objective metric failing to satisfy the client specified objective.

17. The system of claim 16, wherein the instructions cause the processor to:
identify the effective throughput based upon available processing resources of the first device and the second device.

18. The system of claim 16, wherein the instructions cause the processor to:
apply a validity constraint to the recovery objective model to restrict the ingest rate value at which data of the first device is modified from being larger than the effective throughput of the transfer utility replicating the modified data.

19. The system of claim 16, wherein a computing hardware resource is added to the network.

20. A non-transitory computer readable medium comprising instructions which when executed perform a method for data recovery objective modeling, comprising:
determining a recovery objective metric based upon an ingest rate value, corresponding to a rate at which clients modify data that is replicated by a transfer utility from a first device to a second device over a network, and an effective throughput of the transfer utility to replicate the data, wherein the ingest rate value and the effective throughput are used by a recovery objective model to generate the recovery objective metric as a ratio of a time to complete a plurality of null transfers from the first device to the second device to a ratio of the ingest rate value to the effective throughput, and as a ratio of a margin of error percentage metric to a timespan;
determining that the recovery objective metric, specifying an estimated amount of data loss and time to perform a failover from the first device to the second device using current resources of the network and the first and second devices, fails to satisfy a client specified objective of an acceptable amount of data loss and time to perform the failover; and
facilitating modification of computing resources of the network for the transfer utility to replicate modified data from the first device to the second device based upon the recovery objective metric failing to satisfy the client specified objective.

\* \* \* \* \*